UNITED STATES PATENT OFFICE.

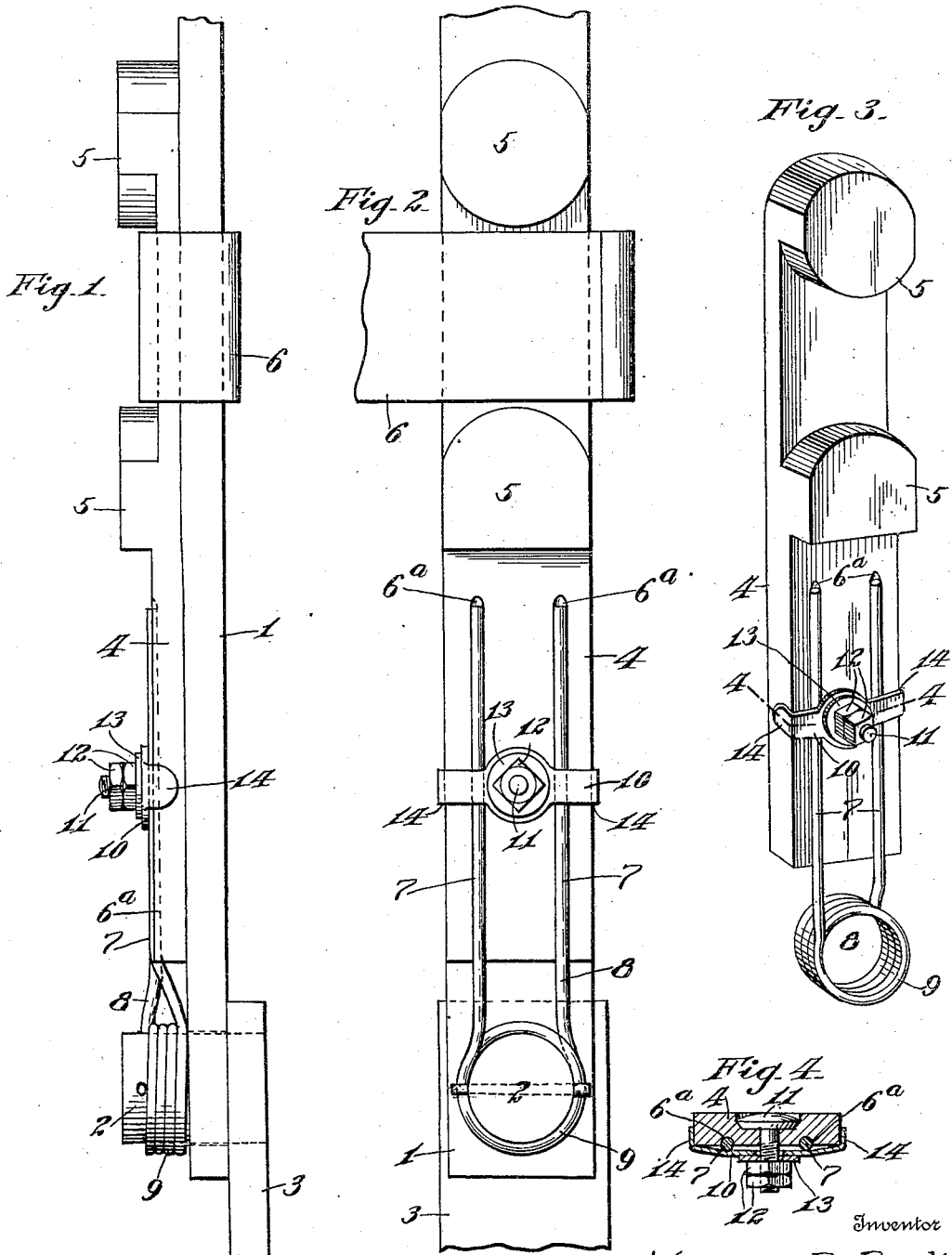

WILLIAM D. PARK, OF PHILADELPHIA, PENNSYLVANIA.

ATTACHMENT FOR PICKER-STICKS.

938,694. Specification of Letters Patent. Patented Nov. 2, 1909.

Application filed March 9, 1909. Serial No. 482,280.

*To all whom it may concern:*

Be it known that I, WILLIAM D. PARK, a citizen of the United States, residing at Philadelphia, in the county of Philadelphia and State of Pennsylvania, have invented certain new and useful Improvements in Attachments for Picker-Sticks, of which the following is a specification.

My invention relates to an improved attachment for picker sticks, the object of the invention being to provide improved means of this character which will permit quick adjustment of the lug strap relative to the picker stick.

A further object is to provide an improvement of this character, which can be cheaply manufactured, readily applied, and will serve as an adjustable mounting for the lug strap to regulate the stroke of the picker stick.

With these and other objects in view, the invention consists in certain novel features of construction, and combinations and arrangements of parts as will be more fully hereinafter described and pointed out in the claims.

In the accompanying drawings, Figure 1, is an edge view illustrating my improvements. Fig. 2, is a face view. Fig. 3, is a perspective view of the attachment removed, and Fig. 4, is a view in cross section on the line 4—4 of Fig. 3.

1 represents an ordinary picker stick having a bearing or fulcrumed upon a journal pin 2, the latter supported in a suitable frame or bar 3.

4 represents my improved attachment, which constitutes a bar adapted to rest against the picker stick, and having rounded enlargements 5 as clearly shown, to receive the lug strap 6 between them, and this lug strap as is ordinarily the case, straddles the picker stick and serves to oscillate the latter. The bar 4 is provided with longitudinal parallel grooves 6$^a$ to receive the parallel ends 7 of an adjusting member 8. This adjusting member comprises a single strong wire coiled between its ends as shown at 9, to form a bearing on the journal pin 2, and the ends of the wire extend parallel as shown at 7, and are tightly clamped in the grooves 6$^a$ by means of a cross bar 10. This cross bar is provided with a central opening to accommodate a threaded bolt 11, the latter having its head countersunk in the inner face of the bar 4, and lock nuts 12 screwed on to its other end against a washer 13, to tightly clamp the cross bar 10 down upon the wires 7 and secure the member 8 at any adjustment relative to bar 4.

The ends of the bar 10 are preferably bent down against the side edges of the bar 4 as shown at 14 in Figs. 3 and 4, so as to hold the bar against turning movement.

It will thus be observed that by loosening the nuts 12, members 4 and 8 can be adjusted relative to each other, and by this means the position of the lug strap may be adjusted relative to the journal 2 pivoting the picker stick, and hence the stroke of the picker stick can be varied by this adjustment to suit any and all conditions.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

1. An attachment of the character described, comprising two members, one member having longitudinal grooves and an opening between said grooves, the other member comprising a wire coiled between its ends and having its ends extending parallel to each other and adapted to enter said grooves in the other member, a clamping bar extending across the first mentioned member and across said wires, a bolt located in the said opening, and nuts on said bolt clamping said clamping bar against said wires, whereby the members may be secured at various adjustments relative to each other.

2. In combination with a picker stick journal pin, a picker stick journaled thereon, an attachment comprising a bar and a wire bent between its ends forming a coil to receive said journal pin, and having its ends extended parallel to each other, means for clamping the ends of said wires at various adjustments relative to said bar, and a lug strap guide on said bar, and a lug strap straddling said bar and the picker stick, and located in said guide.

In testimony whereof I have signed my name to this specification in the presence of two subscribing witnesses.

WILLIAM D. PARK.

Witnesses:
R. H. KRENKEL,
J. A. L. MULHALL.